Feb. 26, 1935. P. J. MORK 1,992,387
DRAG FOR WEEDING POTATO PLANTS
Filed June 4, 1934 2 Sheets-Sheet 1
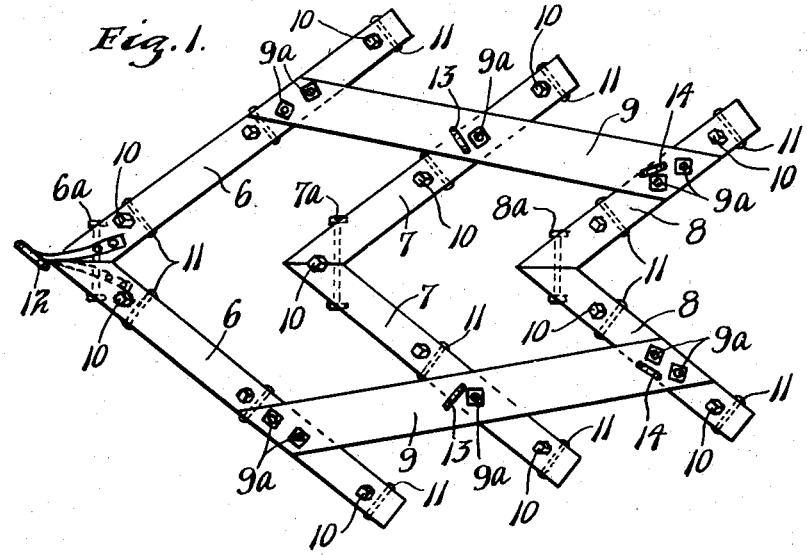
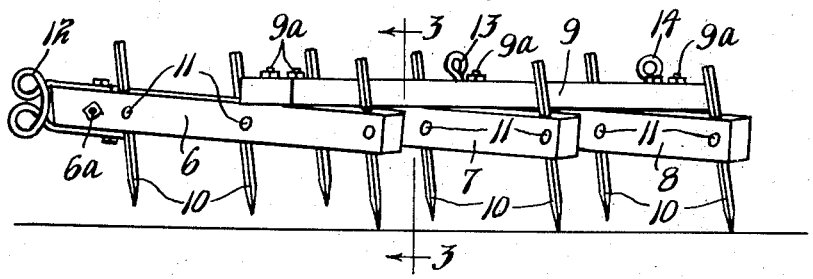
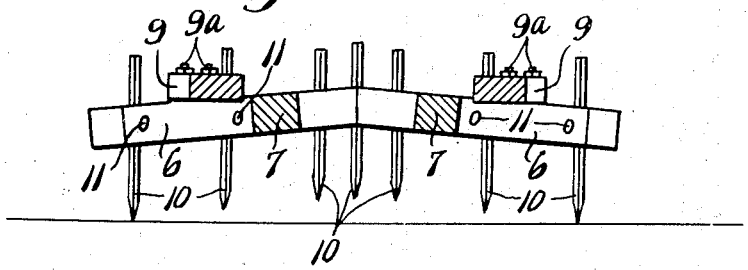
INVENTOR.
PAUL J. MORK.
BY HIS ATTORNEYS.
Williamson & Williamson Feb. 26, 1935.  P. J. MORK  1,992,387
DRAG FOR WEEDING POTATO PLANTS
Filed June 4, 1934   2 Sheets-Sheet 2
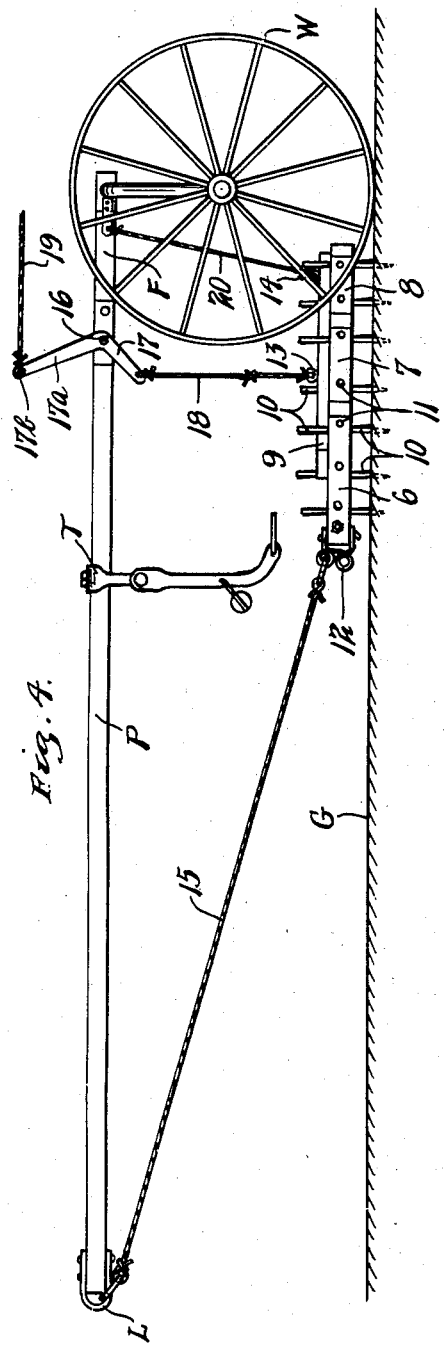
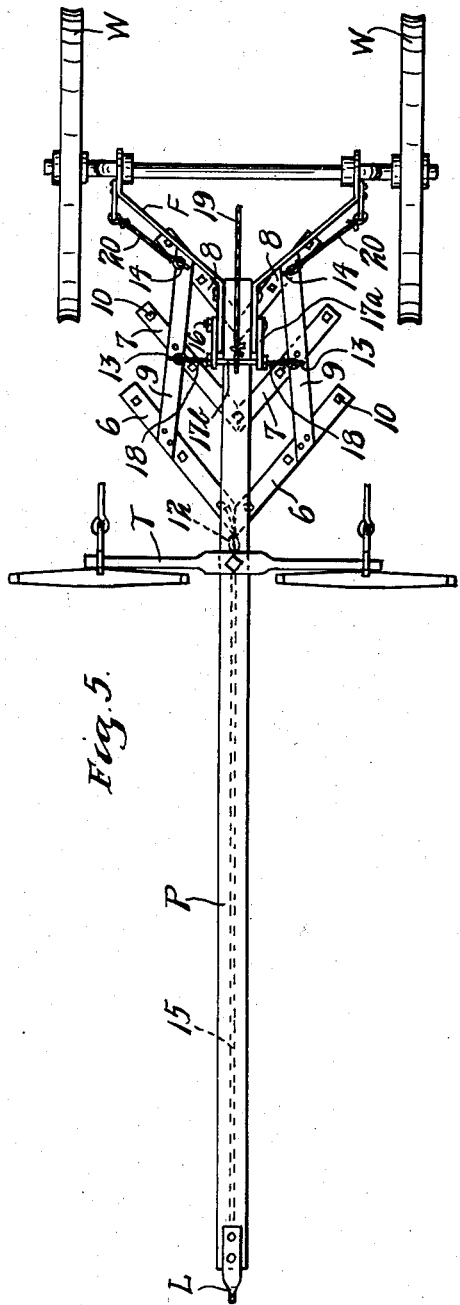
INVENTOR.
PAUL J. MORK.
BY HIS ATTORNEYS.
Williamson & Williamson Patented Feb. 26, 1935

1,992,387

UNITED STATES PATENT OFFICE 1,992,387

DRAG FOR WEEDING POTATO PLANTS

Paul Johan Mork, Winger, Minn.

Application June 4, 1934, Serial No. 728,891

8 Claims. (Cl. 55—128)

My invention relates to agricultural implements and particularly to implements for cultivating and weeding potato fields.

It is well known that potato plants thrive much better if weeds are removed from their immediate vicinity and the earth about them is mulched so as to retain moisture. To attain these results it is necessary to break up any lumps of earth and to break crusts of earth formed following wet weather. These operations must, of course, be performed without injuring the potato plants. It is also known that weeds of many kinds are smothered and die if covered with earth whereas potato plants will grow up through a covering of earth.

For mulching the soil around potato plants a cultivator is not entirely satisfactory since it cannot work the ground between the plants of a row thereof without uprooting the plants. Ordinary field drags cannot be used because they will damage the plants.

It is an object of my invention to provide an implement capable of use to thoroughly break up the earth between potato plants of a row thereof without causing injury to the plants.

Another object is to provide such an implement which is capable of use in covering weeds and potato plants with earth without injuring the plants.

Still another object is to produce such an implement which may be towed by and used in conjunction with a cultivator.

These and other objects and advantages of the invention will be more fully set forth in the following description made in connection with the accompanying drawings, in which like reference characters refer to similar parts throughout the several views, and in which:—

Fig. 1 is a top view of my drag;

Fig. 2 is a side view;

Fig. 3 is a section taken along the line 3—3 of Fig. 2 as indicated by the arrows;

Fig. 4 is a side view of a cultivator with my drag connected in operative relation thereto, and Fig. 5 is a top view.

Referring to the drawings, my potato weeding drag includes a frame comprising several rearwardly diverging and rearwardly sloping V-shaped frame units rigidly connected together by suitable bars or beams. The V-shaped units and the beams may be constructed of wood or other suitable material and may be secured together by bolts or other fastening means.

A pair of rearwardly diverging and slightly downwardly sloping wing-like frame members 6 meet and are connected together at their respective inner and forward ends. The connected ends of the respective members 6 are mitered at such an angle that the same will firmly abut each other and are secured together by bolts 6a extending through suitable apertures in the members 6 as shown.

A second pair of members 7, similar to the members 6 except that they are somewhat shorter, are joined together in the same manner as the members 6, are secured together by bolts 7a and are disposed rearwardly of the members 6 in spaced relation thereto.

A third pair of members 8, similar to the members 6 except that they are somewhat shorter than the members 7, are also joined together in the same manner as the members 6, are secured together by bolts 8a and are disposed rearwardly of the members 7 in spaced relation thereto.

A pair of bars or beams 9 are provided to rigidly connect together the V-shaped structures respectively comprising the members 6, the members 7 and the members 8. One of the beams 9 is placed in such a position that it rests upon the upper sides of the medial portions of the respective members 6, 7 and 8 which project in a common direction. The other beam 9 is similarly placed on the respective members 6, 7 and 8 which project in the other direction. The beams 9 are secured to the members 6, 7 and 8 by means of bolts 9a. The members 6, 7 and 8 are so notched or cut away at the points where they are engaged by the beams 9 that the beams will rest firmly thereon and that each of the members 6, 7 and 8 will extend forwardly and inwardly and somewhat upwardly from its free end to the point of attachment thereof to its companion member.

A series of soil working spikes 10 are carried by each of the members 6, 7 and 8 in suitably located apertures through these members. The apertures are so proportioned and disposed that the spikes 10 are tightly wedged therein and project downwardly and somewhat rearwardly. As shown in the drawings each of the members 6 has one spike 10 located closely adjacent its inner end, another adjacent its outer end and a third located intermediate the first two. One spike is retained in notches in the respective members 7 which cooperate to form an aperture at the joint between the respective members 7. A spike 10 is located in the medial portion of each of the members 7 and another spike is located in the outer end. Each of the members 8 has a spike located in its outer end and another is located a short distance outwardly of its inner end.

The various ones of the spikes 10 are so adjusted in position that the points of the spikes nearest the longitudinal center line of the frame are highest, the points farthest from the center line are lowest and the intermediate points are at intermediate heights as best shown in Fig. 3. The spike 10 located at the joint between the members 7 may be released for easy adjustment by loosening the bolt 7a. The remaining spikes are adjusted by forcibly driving them upwardly or downwardly in the apertures in which they are frictionally retained. Rivets 11 are applied to the members 6, 7 and 8 adjacent each of the spikes 10 as shown to prevent splitting of the members 6, 7 and 8 when the same are constructed of wood.

With the adjustment of the spikes 10 specified above it will be noted that the points or lower ends of the respective spikes 10 carried by any one of the pairs of wing-like members 6, 7 or 8 are disposed in a rearwardly diverging V formation lying in a plane which slopes downwardly toward the rear of the frame. All of the V formations are disposed at substantially the same level so that the respective points of the spikes of all of the series thereof lie on the side surfaces of an isosceles triangular prism having a base parallel to the ground and an upper ridge extending centrally from front to rear of the frame.

At the forward end of the frame a tow-line attachment fitting 12 consisting of a pair of rings and attachment arms is bolted to the members 6 at their inner ends as shown. Screw eyes 13 for attachment of lifting ropes are mounted on the respective beams 9 at the points of intersection of the beams with the frame members 7. Screw-eyes 14 for attachment of guide ropes are mounted on the respective beams 9 at their intersections with the members 8.

My implement is connected with a cultivator in operative relation thereto as shown in Figs. 4 and 5 and as will be described. In the drawings a conventional form of cultivator is shown having wheels W supported by the ground G, a frame F, a draft pole P, a loop L on the forward end of the draft pole P and a double-tree T.

My potato weeding drag is placed beneath the rearward portion of the draft pole P just rearwardly of the double-tree T. A tow rope 15 is attached at its respective ends to the attachment fitting 12 of my implement and to the loop L on the forward end of the pole P.

A short shaft 16 revolubly mounted on the frame F of the cultivator is located substantially above the screw-eyes 13 of my implement and carries on each of its ends a bell-crank including a lifting arm 17 and an operating arm 17a. A lifting rope 18 is connected at one of its ends to each of the screw-eyes 13 and at the other of its ends to the outer end of a corresponding one of the lifting arms 17. The two operating arms 17a are connected together at their outer ends by a long bolt 17b. An operating rope 19 is tied to the medial portion of the bolt 17b and extends rearwardly therefrom. Pulling the operating rope 19 rearwardly will obviously raise the implement from the operative position thereof shown in the drawings. When the implement is in its raised position the rearward portion of the operating rope 19 may be anchored by tying the same to any part of the cultivator which may be convenient.

A guide rope 20 is secured at one end thereof to each of the screw-eyes 14 and extends rearwardly, outwardly and upwardly therefrom. The remaining end of each of the guide ropes 20 is tied to a suitable portion of the frame F of the cultivator. Slack is left in each of the guide ropes 20 so that the potato weeding drag can work back and forth transversely of the cultivator within relatively wide limits determined by the length of the ropes 20.

In normal use of my potato weeding drag, the same, connected as above described, is towed along a row of potato plants in straddling relation thereto. The spikes 10 break up and mulch the earth at the sides of the row of plants and between the individual plants of the row. Weeds of many varieties, when engaged by the spikes 10, are broken off thereby but potato plants are sufficiently tough to deflect the drag to one side or the other instead of being damaged thereby. Easy deflection of the drag by the plants is greatly facilitated in two ways. First, the light weight construction of the drag renders it relatively easy to deflect. Second, the considerable length of the tow rope 15 substantially eliminates the resistance to deflection which would exist if the drag were connected to a non-deflectable towing means by a relatively short tow rope.

As the drag is towed along a row of potato plants both the weeds and the potato plants may be covered with earth. Potato vines will grow up through the covering of earth whereas many kinds of weeds will be smothered by the earth and will die.

With the soil working spikes of my drag adjusted in accordance with my invention as previously described, the device, when drawn along a row of plants in straddling relation thereto, tends to hill up the earth around the plants to thoroughly surround the roots thereof so as to protect the roots and retain moisture therearound.

Obviously, the cultivator with which my device is used may or may not have cultivator shovels mounted thereon in operative position. Also, it should be apparent that my device may be towed behind a cultivator if desired or may be towed by an implement or a vehicle other than a cultivator. Also, my device may be used in connection with many plants other than potato plants.

It is apparent that I have invented a novel, rugged, inexpensive and effective form of potato weeding drag capable of killing weeds and mulching the soil immediately adjacent potato plants without causing damage to the plants.

It will, of course, be understood that various changes may be made in the form, details, arrangement and proportions of the parts, without departing from the scope of my invention, which, generally stated, consists in a device capable of carrying out the objects above set forth, and in the novel parts and combinations of parts disclosed and defined in the appended claims.

What is claimed is:—

1. A weeding drag comprising, a frame and a multiplicity of ground working tools of equal length secured to said frame and projecting downwardly therefrom, said frame being so shaped that the lower ends of said tools are located on the side surfaces of an isosceles triangular prism having a base parallel to the ground, and an upper ridge extending centrally from front to rear of said frame.

2. A weeding drag comprising, a frame and a multiplicity of soil working spikes secured to said frame and projecting downwardly and somewhat rearwardly therefrom, the lower ends of said spikes being located on the side surfaces of an isosceles triangular prism having a base parallel to the ground and an upper ridge extending centrally from front to rear of said frame.

3. A weeding drag comprising, a frame and at least two spaced series of spaced soil-working spikes of equal length secured to said frame and extending downwardly therefrom, said frame being so shaped that the lower ends of the respective spikes of each series are disposed in a rearwardly diverging V formation lying in a plane sloping downwardly and rearwardly from the vertex of the V.

4. The structure defined in claim 3 and the vertices of the respective V formations being disposed at substantially the same level.

5. A weeding drag comprising, a frame and at least two spaced series of spaced soil working spikes of which the respective spikes are secured to said frame and extend downwardly therefrom with a slight inclination rearwardly, the lower ends of the respective spikes of each series being disposed in a rearwardly diverging and rearwardly and downwardly sloping V-shaped formation.

6. A potato weeding drag comprising, a frame, means for towing said frame, a greatly elongated element flexibly connecting said frame to said towing means and at least two spaced series of spaced soil working spikes secured to said frame, each of said spikes extending downwardly and somewhat rearwardly from said frame and the respective spikes of each series being disposed in a rearwardly diverging and rearwardly and downwardly sloping V-shaped formation.

7. A potato weeding drag comprising, a frame adapted to be towed over the ground, said frame including pairs of rearwardly diverging and somewhat rearwardly sloping wing-like members, and a series of spaced, soil-working spikes carried by and projecting substantially downwardly from each of said wing-like members, the lower ends of the respective spikes of each series being disposed in an outwardly, rearwardly and somewhat downwardly sloping V formation.

8. A weeding drag comprising a frame including a plurality of spaced rearwardly and somewhat downwardly diverging V-shaped members having their respective vertices disposed substantially on a horizontal line extending from front to rear of said drag, beams rigidly connecting said members, and a multiplicity of substantially identical soil working elements, some of said elements being mounted in spaced relation to each other on each of said members to extend downwardly and somewhat rearwardly therefrom in respective vertical planes parallel to said line whereby the lower ends of said elements will lie on the side faces of an isosceles triangular prism extending parallel to said line.

PAUL JOHAN MORK.